Oct. 14, 1952 D. GLASGOW ET AL 2,614,036
ARTIFICIAL FLOWER AND CLUSTER AND METHOD OF MAKING SAME
Filed June 14, 1946 3 Sheets-Sheet 1
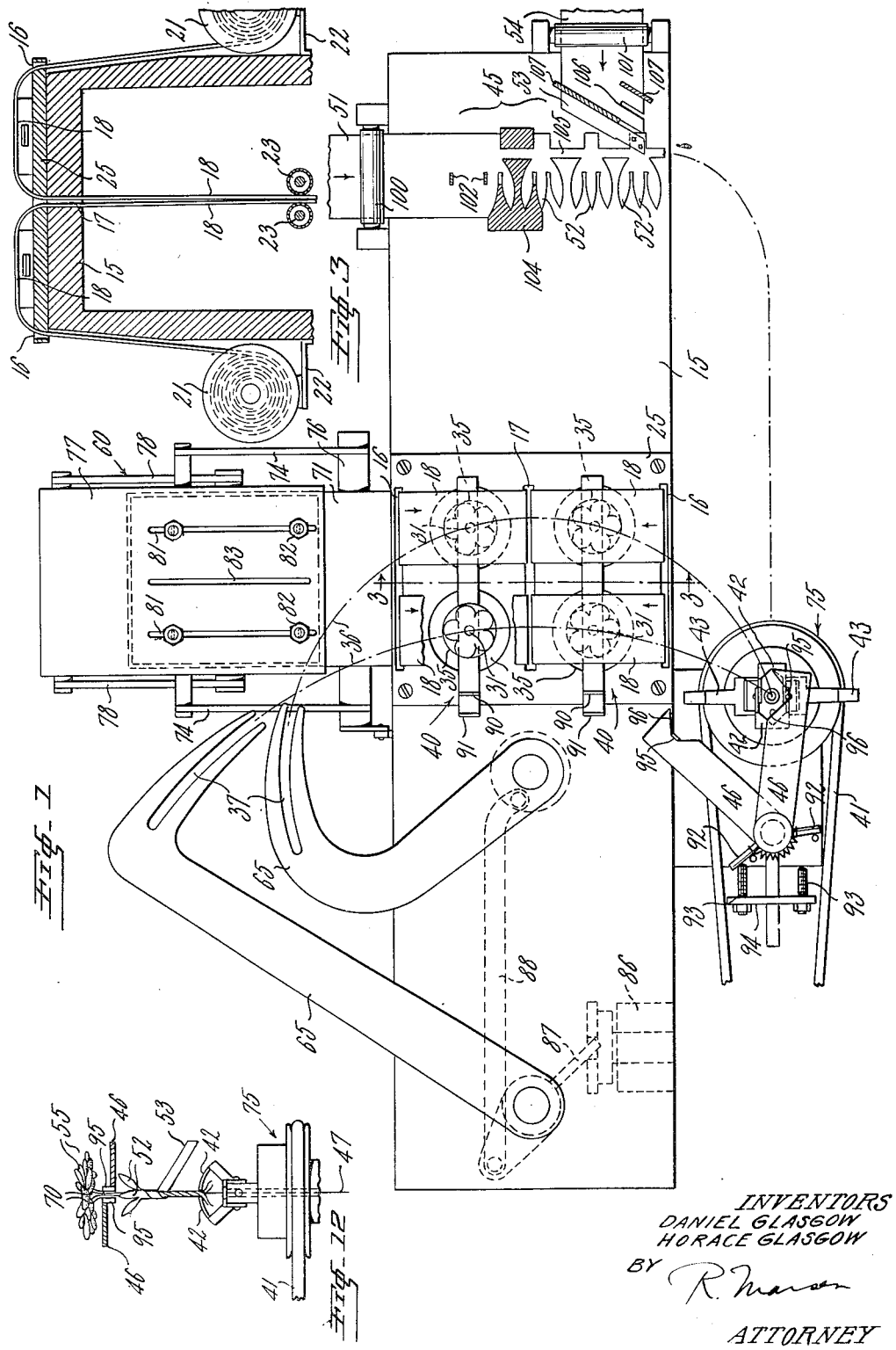
INVENTORS
DANIEL GLASGOW
HORACE GLASGOW
BY R. Marson
ATTORNEY

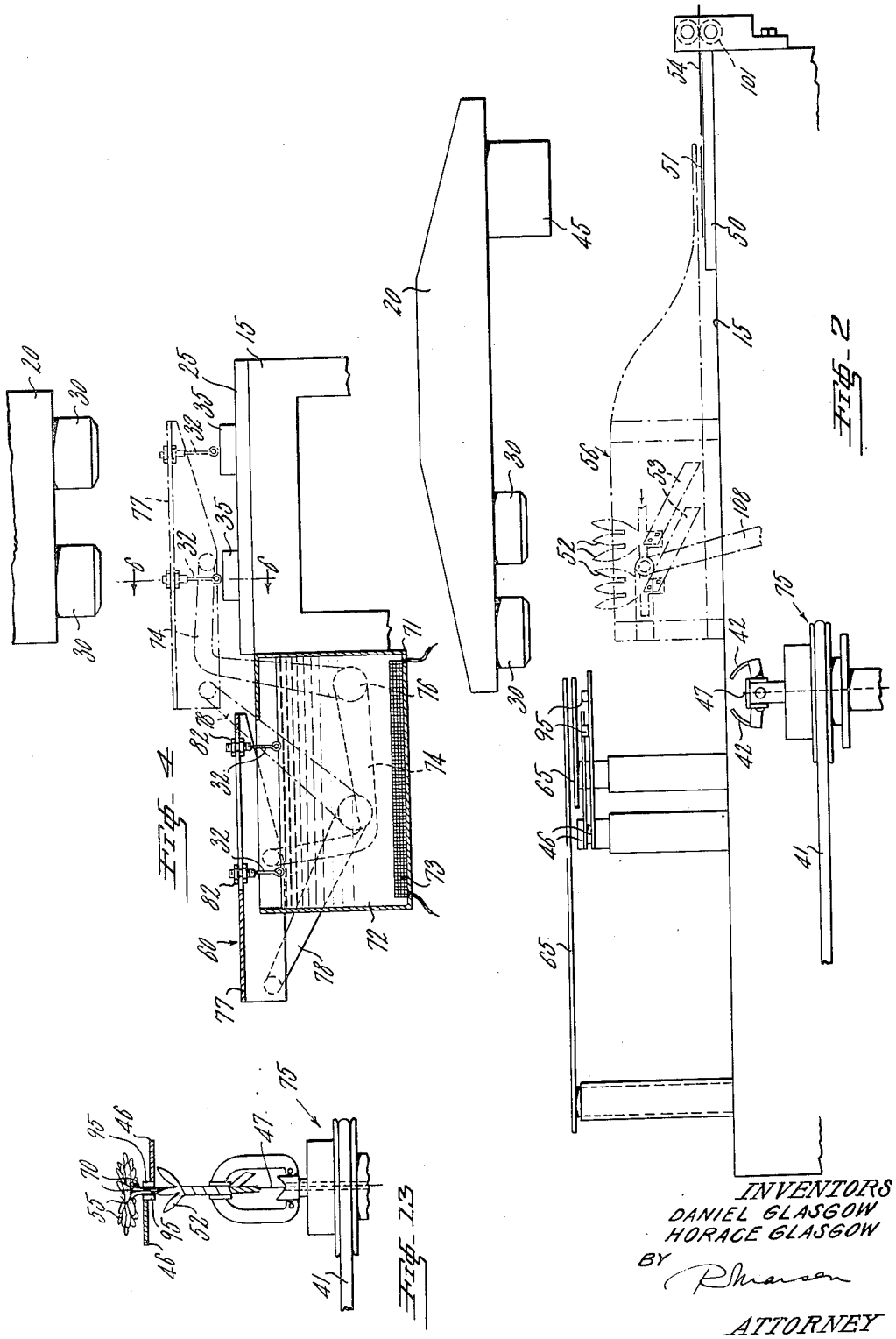

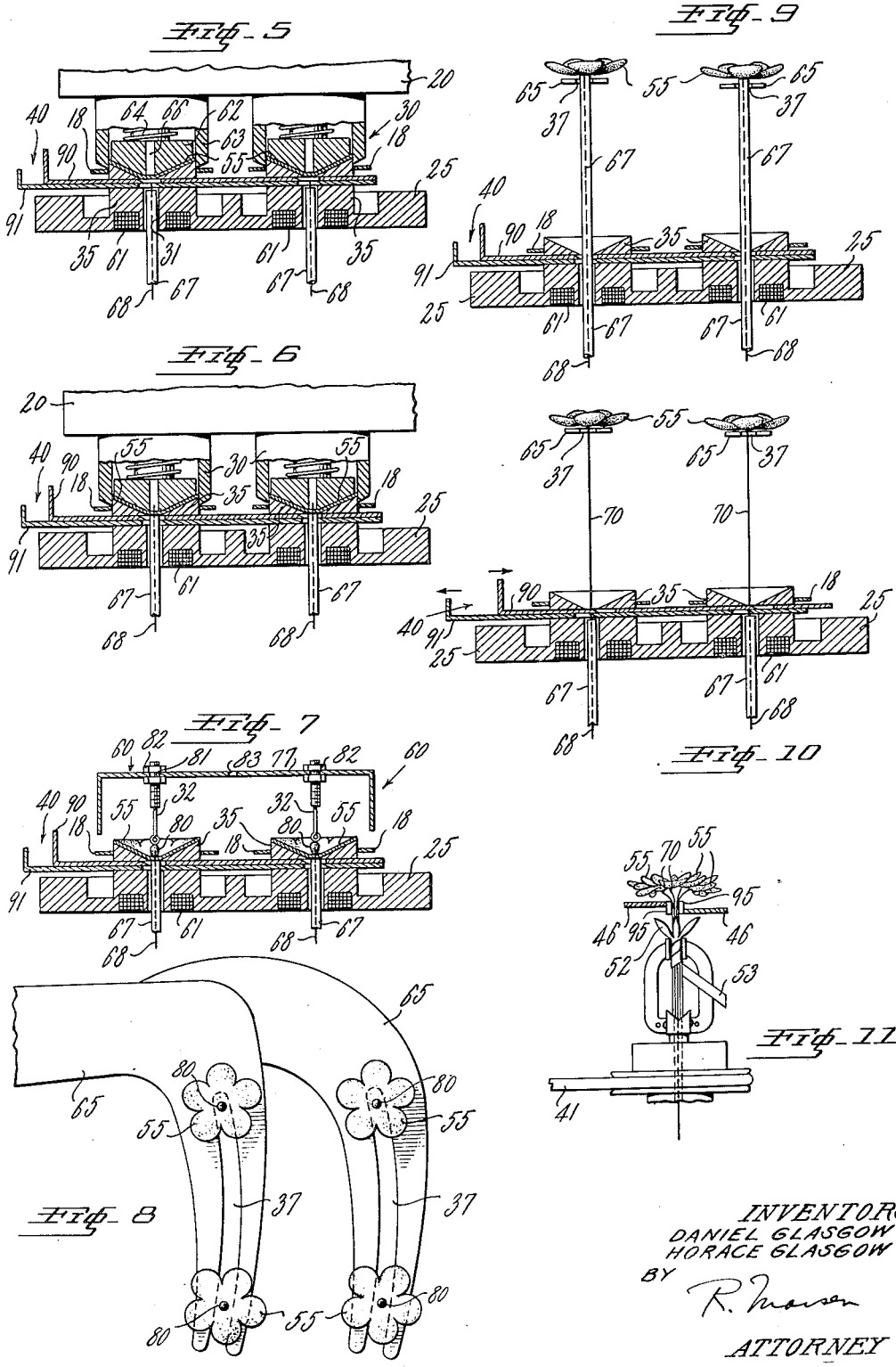

Patented Oct. 14, 1952

2,614,036

UNITED STATES PATENT OFFICE 2,614,036

ARTIFICIAL FLOWER AND CLUSTER AND METHOD OF MAKING SAME

Daniel Glasgow and Horace Glasgow, New York, N. Y.

Application June 14, 1946, Serial No. 676,630

10 Claims. (Cl. 41—13)

This invention relates to a novel artificial flower and novel methods and apparatus for making the same. More particularly the invention relates to a novel method of making artificial flowers and grouping a plurality of such flowers into a cluster.

Artificial flowers and clusters thereof are used in large quantities for ornamental purposes, more particularly in the millinery field. Hitherto, all such flowers either have been handmade in foreign countries and imported or partially machine made and partially handmade at relatively great cost in this country. Certain types of artificial flowers have hitherto been considered impossible to manufacture by machine.

Such artificial flowers as have hitherto been made in this country have been manufactured by cutting out and shaping a petal structure. For example, several layers of cloth have been superposed and an operator has hand forced a cutting die through the stacked material. In another operation, a stem is prepared by cutting a short piece of wire and securing a globule of material on one end thereof to simulate the anther or small seed atop the stamen of the flower. Such globule is known in the art as a "pep head." Either during the cutting of the petal structure or subsequently thereof, a hole is pierced substantially centrally through the face of the petal structure. The thus prepared combined stem and "pep head" is then inserted through such hole, point first, from the face to the back, to complete the flower. It has hitherto been considered impossible to machine cut flowers from a continuously moving strip or strips of material.

The petal structures of such flowers are made from a suitably treated material, such as a treated fabric. This fabric is cut to form the petal structure and is then further processed to give shape to the petal structure so that the resultant artificial flower bears a resemblance to a natural flower.

A number of flowers made in this fashion are usually grouped by intertwining their stems to a cluster, known in the art as a "Melee" cluster. Either the individual flowers or the cluster may have a spray or sepal and stem wrapper thereon. Such spray usually comprises a green colored fabric or paper material cut to simulate leaves or petals. The stem wrapper usually comprises a piece of green crepe paper wrapped around the stem.

In the millinery art, such "Melee" clusters, which may, for example, comprise four like or unlike flowers, are further grouped, usually in multiples of four, to form a corsage or bed of flowers for securement to a lady's hat, for instance.

Due to the complications involved, it has heretofore been considered impossible to manufacture such artificial flowers and to group them into clusters by machine. Among other problems is that of properly cutting and shaping the petal structure, individually attaching the stems thereto and grouping the flowers into a cluster in a continuous production operation. While various attempts have been made to solve this problem, none have hitherto worked out in practice.

It is among the objects of this invention to provide a novel artificial flower, a novel method of making the same and novel apparatus for performing each method; to provide a novel method for making artificial flowers from a continous supply of suitably treated material, for associating wire stems with the petal structures from a continuous supply of stem wire and for applying "pep heads" to the wire stems; to provide novel apparatus for performing such method; to provide a novel method and apparatus for grouping such flowers into a cluster, and for applying a spray and stem covering to the cluster; to provide novel apparatus of the production variety for forming artificial flowers, forming a combined spray and stem covering, grouping the flowers into a cluster, and applying the spray and stem covering to the cluster; and in general to provide a novel artificial flower and economically feasible method and apparatus for making the same and grouping the flowers into a cluster.

These and other advantages and novel features of the invention will be apparent from the following description and the accompanying drawings. In the drawings:

Fig. 1 is a plan view illustrating one form of apparatus with which the invention method may be practiced.

Fig. 2 is a somewhat diagrammatic elevation view of the apparatus shown in Fig. 1.

Fig. 3 is a somewhat diagrammatic transverse sectional view on line 3—3 of Fig. 1.

Fig. 4 is a transverse elevation view, partly in section, illustrating a portion of the apparatus shown in Figs. 1 and 2.

Figs. 5 through 7 are sectional views illustrating successive steps in the method of the present invention.

Fig. 8 is a plan view illustrating a further step in the method.

Figs. 9 and 10 are sectional views illustrating additional steps of the invention method.

Figs. 11, 12 and 13 are elevation views illustrating further steps in the invention method.

Generally speaking, according to the present invention, petal structures for artificial flowers are successively prepared, either singly or in groups, by simultaneously cutting and forming the petal structure from a supply or strip of suitably treated material. Such cutting and forming is accomplished by novel die means and petal structures successively formed and cut from the strips. As a novel step of the invention, wires, from a continuous supply of wire such as a reel, are pierced through the material used to form the petal structures from the back of the face thereof so that a short portion of each wire projects beyond the face. The wire may be either plain or suitably coated with a plastic material or the like, and the coating may be colored to simulate a flower stem.

The stem is secured to the petal structure by a "pep head" comprising a globule of adhesive material such as glue, wax, plastic material or the like. This "pep head" is placed on the projecting wire end and in contact with the petal structure. The "pep head" may be of any suitable material and suitably formed and/or colored to simulate the usual center portion of a flower petal structure. The wires are then severed at a preselected distance from the petal structures to form the flower stems. The individual flowers may then be grouped into a cluster.

Meanwhile, and to form a leaf structure for the flowers, sprays are successively cut from a supply of suitably colored material such as paper, cloth, plastic material, or the like preferably colored green, and each spray has attached thereto a narrow "tail" of stretchable material such as crepe paper, again preferably green in color. After the flowers have been grouped together into a cluster, a spray is wrapped around the cluster a short distance beneath the petal structures. The stems are then secured together to integrate the cluster. The tail or stem wrapper is then wrapped around the grouped stems to cover the same and simulate a natural flower cluster. Of course, if the stem wires are initially coated with a suitably colored material, the spray and stem wrapping operation is not necessary.

In order that the clusters may be later assembled with other clusters to form a corsage or bed, a fifth wire may be secured with the stems and extend therebeyond a short distance. Alternatively, one of the stems may be made longer than the others so that a single wire projects from the cluster. These projecting single wires and clusters may be later secured together to unite a group of clusters into a corsage or bed.

The accompanying drawings illustrate one form of apparatus with which the method of the invention may be practiced. However, such illustration is exemplary only and the invention may be practiced manually or with other types of apparatus. The invention involves a novel way of manufacturing the flowers from continuous fabric and wire, and it is immaterial whether this method is practiced manually or by machine. Accordingly, certain portions of the drawing are shown diagrammatically as embodying certain well-known devices for performing different steps of the method.

Referring more particularly to Figs. 1, 2, 3 and 4 of the drawings, one form of apparatus which may be used to practice the invention comprises a bed or base plate 15 and a cooperating ram or head 20 movable, in the embodiments shown, vertically with respect to the base plate or bed. It should be understood, however, that such vertical movement is shown for purposes of illustration only, and that any other direction of movement may be used if desired. Furthermore, the apparatus of the invention is preferably motor driven and suitable timing cams are provided in a well-known manner for assuring the proper sequence of operations. As the particular arrangement and form of the timing cams and associated driving mechanism forms no part of the present invention, such details have been omitted from the drawings in order that the principles of the invention may be clearly and distinctly illustrated.

Furthermore, while the several operations have been indicated, for convenience sake, as taking place on a single machine, it is not essential that this be done. The several different steps of the method may, with equal facility, be performed on different machines or by assembly line techniques. In the illustrated machine, the vertically movable head 20 may be operated by any suitable means such as mechanical gearing, a hydraulic piston or the like, and the moving means may be mounted at the rear of the machine or may extend through the bed plate 15.

The principles of the invention will be best understood by a brief outline of the several steps of a preferred method with particular reference to Figs. 1, 2, 3 and 4. As stated, head 20 moves vertically, under pressure, with respect to bed plate 15. Such movement is cyclical, and head 20 goes through one cycle of a vertical movement with respect to bed plate 15 during the formation of each flower or set of flowers. As shown, the apparatus is arranged to make four artificial flowers at a time. For this purpose, cooperating die means are provided on bed plate 15 and head 20.

These die means may include a multiple female die 25 replaceably mounted on bed plate 15 and individual male die 30 removably secured to head 20. Four male dies 30 are shown, which cooperate with four female dies 35 included in multiple die plate 25. More or less than four sets of cooperating dies may be provided, depending upon the number of flowers to be formed in a single operation. Accommodation for differing numbers of die sets is afforded by the interchangeability of die plate 25 with bed 15 and die 30 with head 20. In a manner, and for a purpose to be described, die plate 25 is provided with suitable heating means, preferably electrical, and female dies 35 are provided with shearing means indicated generally at 40. The dies 30 and 35 are operative to simultaneously cut and shape the petal structure for the flower. Another set of cooperating dies is carried by bed plate 15 and head 20. This set is for forming a spray and attached stem covering for the flower in the event plain, uncoated stem wire is used, and includes an upper male die 45 secured to head 20 and a lower female die 50 on bed plate 15.

A number of strips of suitably treated petal material are fed from suitable supplies thereof, and are individually led upwardly through slots 16, 16 in bed plate 15, over female dies 35, and downwardly through central slot 17 in the bed plate. These strips of material are indicated at 18. Material 18 may be a fabric such as is customarily used for making artificial flowers and is so treated that, when shaped under pressure with heat applied, it will retain its set shape when removed from the heat means.

Referring to Fig. 3, the material 18 may, for example, be fed from reels 21, 21 illustrated as mounted on brackets 22, 22 secured to base plate 15. After passing over the female die plate 25, the material from opposite sides is fed down through slot 17 where it passes through a pair of corrugated rollers 23, 23. Rollers 23 are step operated in synchronism with the cycling of head 20 by suitable interconnecting means, such as timing cams, gearing and the like.

The feeding of material 18 is coordinated with the movement of head 20 so that the several strips of material 18 are intermittently advanced a predetermined amount during each cycle of operation. As head 20 moves downwardly, material 18 is shaped between the upper and lower dies 30, 35 and a petal structure 55 (Figs. 5 through 13) is severed from the material. At the same time, the material 18 is heated so that it will retain its die pressed shape.

Head 20 remains down for a short interval, firmly clamping the petal structures between the upper and lower dies. It will be noted that each of the lower dies is provided with a central aperture 31. Also, as will be explained, continuous supplies of wire are provided in operative association with each of the lower dies. This wire is fed through tubes axially aligned with apertures 31. The operation of the apparatus is such that the wires in the tubes are cut off a very short distance above the tube ends, preferably of the order of $\frac{1}{32}''$ to $\frac{1}{16}''$.

In a preferred embodiment of the method, while the petal structures remain firmly clamped, the aforementioned tube means move upwardly a short distance to pierce the projecting wire ends a short distance through the petal structures from the rear to the face thereof. However, the wires may be pierced through the material of the petal structures before such structures are cut and/or shaped from the material, or may be pierced simultaneously with the cutting and/or shaping operation. After such piercing, head 20 moves upwardly releasing the pressure on the petal structures. At the same time, a pep head applying means, generally indicated at 60, moves inwardly so that fingers 32 attached thereto and each carrying a globule of adhesive material, such as soft wax, glue, plastic, or the like, are engaged with the projecting ends of the wires and deposit such globules onto the wire ends and the petal structures. Such globules form pep heads adhesively securing the petals to the wire ends. The "pep heads" may be suitably formed and colored to lend an appearance of reality to the flower.

The pep head applying structure 60 then retracts to the solid line position shown in Fig. 4 and at the same time the tube means move upwardly a predetermined distance. During such upward movement, fork means 65, 65, swingably mounted on bed plate 15, swing from the solid line position shown in Fig. 1 along the arcs shown by dot and dash lines 36 in Fig. 1 to a position in which the slots 37 in the fork means receive the projecting tubes and the fork means engage beneath the petal structures of the flowers. The tube means then retract to their initial position, at which time shearing means 40 is operated to cut off each of the wires providing a stem 70 for each of the flowers. The flowers are now completely formed.

The next operation is that of assembling the four flowers into a cluster. For this purpose, the spinner mechanism generally indicated at 75 may be provided and is constantly rotated by suitable means such as a belt drive 41. Spinner 75 includes a first pair of clamp means 42 and a second pair of clamp means 43. Fork 65 again moves in a clockwise direction so that the four flowers are brought into alignment over the center of spinner 75 whereupon a clamping means comprising a pair of fingers 46 is cam operated to grip the four stems just below the petal structures.

A spray and stem wrapping are also provided for the flower cluster in the event plain uncoated stem wires are used. The spray is cut from a roll of suitably colored material 51 by means of dies 45 and 50. These dies form a series of interconnected sprays 52. The dies also form a narrow "tail" or stem wrapper 53 for each spray 52 and attach these "tails" to the sprays in a manner to be described. "Tails" 53 are formed from a strip of suitable material, preferably crepe paper, indicated at 54. Suitable means indicated generally at 56 are provided for feeding sprays 52 and their attached wrappers 53 to spinner 75.

When the flowers are aligned over the center of spinner 75, the latter rises a short distance and suitable cam means operates clamps 43, 43 to engage strip 105 of spray 52. The spray is fed by means 56 into a position where one of the sprays projects outwardly from means 56 in position for grasping by clamps 43. The rotating clamps quickly wrap the spray around stems 70.

Subsequent to such wrapping, spinner 75 is lowered to the position shown in Fig. 12 and other cam means operate to close clamps 42 to grip the lower ends of stems 70. As the upper parts of the stems are held fixed while the lower parts thereof are rotated, a twisting together of the stems is provided. Desirably, a fifth wire 47 is moved upwardly through the center of spinner 75 by suitable wire feeding means and is twisted together with the stems of the flower in such a fashion that a portion of wire 47 projects beyond the lower ends of the twisted stems. Alternatively, one of these flower stems may be made longer than the other to provide this projecting wire portion which is used in assembling the flower structures to form a corsage or bed of flowers.

Subsequent to the stem twisting operation, clamps 42 open, spinner 75 rises a shorter distance and clamps 43 again close gripping wrapper 53 therebetween. Synchronized severing means included in the feeding means 56 sever the individual sprays from the interconnected spray strip. Clamping means 43 wrap "tail" 53 spirally around the stems to cover at least the twisted portion thereof. Sequentially operable severing means are provided in association with the wire feeding means of spinner 75 to sever wire 47. The completed cluster may then be removed either manually or mechanically from the spinner. Subsequently, the cluster may be grouped with other clusters to form a corsage or bed of flowers.

The operation of the apparatus in detail will be best understood by particular reference to Figs. 3 through 10. As shown, lower die plate 35 is recessed to receive electrical heating elements indicated at 61 by means of which the female dies 35 are heated. Male dies 30 include a pair of relative telescoping members 62, 63. A spring 64 normally urges member 62 outwardly with respect to member 63. Member 62 constitutes the die proper and member 63 constitutes, in cooperation with female die 35, a shear for material 18.

Referring to Fig. 5, as head 20 moves downwardly, die member 62 presses material 18 into female die 35. Upon further movement downwardly of head 20, shear 63 slides along the outer surface of female die 35 shearing petal structures 55 from the material. The dies remain in this position for a short interval. Cooperating aligned apertures 31 and 66 are formed in dies 35 and 30 respectively. A wire feeding means schematically illustrated as tube 67, has its upper end extending into apertures 31, and wires 68 project upwardly a short distance beyond the upper ends of tubes 67. Such distance is preferably of the order of $\frac{1}{32}''$ to $\frac{1}{16}''$. The purpose of this arrangement is to provide support along their lengths for wires 68 so that the projecting ends of the wires may be pierced through petal structures 55. Preferably, tubes 67 contain well-known ball-cone type wire feeding means and back feed check means.

During the time that dies 30 and 35 are in engagement, the material 18 is heated and thus retains its shape. During such heating, tubes 67 move upwardly, as shown in Fig. 5, piercing the projecting end of wire 68 through petal structure 55. Head 20 then moves upwardly releasing die 30 from die 35.

As head 20 moves upwardly, the pep head applying mechanism 60 comes into operation. This mechanism is shown more particularly in Figs. 1, 4 and 7, as including a tank 71 suitably mounted at one side of bed plate 15 and containing a supply of adhesive material 72 such as glue, wax, soft plastic material, or the like. Electric heating means, generally indicated at 73, are provided to maintain material 72 in a semi-fluid state.

A first pair of angular links 74, 74 are pivotally mounted at 76 on tank 71, and have their outer ends pivotally interconnected to a channel shaped plate 77, adjacent the central portion thereof. A second pair of links 78, 78, likewise pivotally mounted on tank 71 have their outer ends pivotally connected to plate 77 adjacent its rearmost portion. A plurality of fingers 32 are adjustably mounted on plates 77 by extending through elongated slots 81 therein and are secured to the plate by clamping means 82. Other slots may be provided in plate 77, as indicated at 83, depending upon the particular adjustments of fingers 32 desired which, in turn, is dependent upon the number and size of flowers being formed at one time.

Normally, plate 77 occupies the position shown in solid lines in Figs. 1 and 4, with fingers 32 dipping into material 72. As head 20 moves upwardly, links 74 and 78 are pivoted in a clockwise direction, as viewed in Fig. 4, to move plate 77 to the dotted line position shown in Fig. 3. This is the same as the solid line position shown in Fig. 7, which is a transverse sectional view on the line 6—6 of Fig. 4. During such movement, fingers 32 carry globules 80 of material 72 into juxtaposition with the ends of wire 68, applying globules 80 to the wires and to the petal structures 55 to adhesively unite the petal structures to the wires. Through the medium of suitable timing cams, plate 77 is then swung back to its solid line position shown in Figs. 1 and 4.

The operations shown more particularly in Figs. 8 and 9 then take place simultaneously. While these operations will be separately described, it should be understood that their timing is concurrent. Referring to Figs. 1 and 8, forks 65 swing clockwise to a position in which the centers of the female dies 35 are aligned in slots 37. This operation takes place through the medium of suitable cam mechanism 86 operating forks 65 through connecting links 87 and 88. At the same time, tubes 67 move upwardly to the position shown in Fig. 9, so that, as forks 65 swing inwardly, they engage beneath petal structures 55. During all this time, shear 40 is inoperative.

This shear comprises a pair of metal strips 90, 91 having apertures aligned with each other and with apertures 31 in dies 35, in the open or inoperative position of shears 40. It will be noted that opposite edges of the apertures in each of the members 90 and 91 are bevelled to provide a scissors action when the members 90 and 91 are moved longitudinally to each other.

After forks 65 are in place, tube 67 moves downwardly again to the position shown in Fig. 10. As the tube reaches the downward position, shear 40 operates by relatively sliding movement of members 90, 91 through the medium of links connected to suitable timing cam operated mechanism. This shears wire 68 a short distance above the top of tube 67 providing stem 70 on the flower and leaving a short length of wire projecting above each tube.

Fingers 65 now move counter-clockwise again, carrying the four flowers into a group centered over spinner 75 (Fig. 1). Clamping means 46 associated with the spinner are provided with flanges 92 engageable by adjustable abutments 93, 93 mounted in a member 94 operated by the timing cam mechanism. As the flowers reach the center of spinner 75, carrier 94 moves abutments to engage flanges 92 thus moving clamps 46 to the closed position. In such closed position, the several stems are gripped between faces 95, 95 at the bottom of notches 96, 96. This firmly clamps the four stems together. Simultaneously, a wire feeding mechanism associated with spinner 75 moves fifth wire 47 up into engagement with the stems, and the clamping means 46 likewise hold wire 47 in association with the flower stems. Wire 47 is severed at a point sufficient to leave a projecting portion of the wire extending beyond the ends of stems 70.

In order to improve the appearance of the cluster in the event uncoated stem wire is used, a spray and stem covering are wrapped around the twisted portions of stems 70. This operation takes place in the following manner. During one cycle of operation of head 20, clamp 45 cooperates with clamp 50 to perform partial punching and severing operations on paper strips 51 and 54. These strips are intermittently fed longitudinally at predetermined coordinated rates by means generally indicated as rollers 100 and 101. These rollers are operated by step-by-step mechanism in coordination with the movement of head 20. Taking a single spray 52 as an example, during one cycle of movement of head 20, a pair of apertures 102 are punched through strip 51 and during the next cycle of head 20, one half of each of an adjacent pair of sprays is cut out by the die 104. The result is to form a series of interconnected sprays 52 joined by a narrow strip 105.

Taking strip 54, during one cycle of operation, a slot 106 is cut diagonally therein. On the second cycle beyond the initial cycle, a die member 107 cuts the remainder of slot 106, severing "tail" 53 from strip 54. At the same time, points on die 45 punch holes through both tail 53 and spray 52 uniting the tail to the spray. During all this time, the combined spray and stem wrappers are fed toward spinner 75, with an intermittent synchronized motion by suitable feeding means generally indicated at 56. For example, means 56 may comprise a pair of parallel plates having a finger 108 reciprocally engaging the sprays to move them along means 56. Severing means of a conventional type is incorporated in feeding means 56.

At the same time as the flowers have been centered over spinner 75, means 56 will have projected one of the sprays 52 toward the spinner. As particularly shown in Fig. 11, the spinner rises a short distance and suitable cam means included in the spinner operates to close clamps 43 to engage the spray above tail 53. The spray is thus wrapped about stems 70. Spinner 75 then descends to the position shown in Fig. 12.

Cam mechanism associated with spinner 75 then operates clamps 42 from the position shown in Fig. 2 to the position shown in Fig. 12 to grip the lower ends of the stems. As stated, spinner 75, with its clamps 42 and 43, is continually rotated at a high rate of speed through suitable means such as a belt 41. This action effects the twisting of stems 55 as shown in Fig. 12, due to the upper ends of the stems being held stationary while the lower ends thereof are rotated. The flowers are then thus joined into a cluster.

After stems 70 have been twisted together, clamps 42 are released by the cam means in spinner 75, spinner 75 rises a shorter distance and clamps 43 move to the closed position to grip wrapper 53. The rapidly rotating clamp means 43 quickly wrap crepe paper covering 53 spirally around the remainder of the twisted stems to simulate a natural flower cluster. Following such wrapping, the completed cluster may be removed from spinner 75 in any desired manner, either manually of mechanically.

As stated, the clusters may be later united to form a corsage or bed of flowers. Also, fifth wire 47 may be dispensed with by making one stem 70 longer than the other stems or by making all the stems longer. The assembly of the clusters into a larger group may take place in coordination with the cluster forming operation or may be performed at another time or another place. The particular apparatus shown in the drawing has operated successfully in practice, and its features of adjustability provide for handling stem lengths from 1″ to 3″ and petal material widths from ⅜″ to 2½″.

In contradistinction to the prior art, the flowers are formed from continuous strips of material and are simultaneously cut and shaped. Additionally, the stems are provided from continuous lengths of wire, and the pep heads are attached after insertion of the wire through the petal structures. This eliminates the necessity for providing individual stems having pep heads already attached for incorporation into the flowers. These novel ideas permit the machine manufacture of artificial flowers and their assembly into clusters, whch has hitherto been considered impossible. In production, the flower clusters may be produced at the rate of several hundred per hour.

Specific apparatus has been shown for performing the several functions in order to illustrate the several steps of the method. However, the method is not dependent upon any particular apparatus and may be performed with different devices or by hand. Additionally, all the several operations need not take place on the same machine, as it may be desirable in practice to separate the several steps and perform the same on individual machines. The essence of the invention resides in the method of manufacturing the flower, although novel apparatus, as shown in the drawings, has been designed and is capable of effectively practicing the method on a production basis.

Also, the stem wires may be pierced through the fabric material either before, during or after the forming of the petal structures from the material. The essential feature of the invention is that the petal material is first pierced by the wire, after which the projecting wire end is secured to the petal structure by application of the adherent "pep head." The latter, of course, may be made of any suitable material and may be suitably shaped and/or colored to make the completed flower as natural looking as possible.

While, for purposes of exemplifying one way in which the invention may be practiced, a spinner mechanism has been shown for intertwisting the wire stems, it is desired to emphasize that this particular way of securing the stems together is not the only method by which such a result may be accomplished. For example, in the event plastic material coated wire is used for the stems, suitable heating means of any desired type may be used to at least partially fuse the plastic coatings so that the stems will be adhered together. Also, if plain uncoated wire is used for the stems, a soldering or spot-welding operation may be used to secure the stems together. Such other ways of securing the flowers into a cluster have not been illustrated in the drawings in order to simplify the illustration of the invention and because the apparatus for performing such operations is well-known to those skilled in the art.

While a specific embodiment of the invention has been shown and described in some detail to illustrate the application of the principles thereof, it will be understood that the invention may be otherwise embodied without departing from such principles.

What is claimed is:

1. A wire stemmed artificial flower comprising, in combination, a substantially flat petal structure; a wire stem extending substantially centrally through said petal structure; and a globule of adhesive engaged with said stem and the face side of said petal structure adhesively securing said stem in unitary relation to said petal structure and forming a pep head for the flower, said adhesive comprising the sole means securing said stem to said petal structure.

2. A wire stemmed artificial flower comprising, in combination, a substantially flat petal structure; a wire stem extending substantially centrally through said petal structure and having a portion projecting upwardly from said petal structure; and a globule of adhesive engaged with said stem portion and the face side of said petal structure and adhesively securing said projecting stem portion in unitary relation to said petal structure and forming a pep head for the flower, said adhesive comprising the sole means securing stem to said petal structure.

3. A wire stemmed artificial flower comprising, in combination, a substantially flat structure; a wire stem having a short portion thereof extending substantially centrally through said petal structure from the rear side to the face side thereof and projecting a short distance beyond the face side; and a globule of adhesive engaged with said stem portion and the face side of said petal structure and adhesively securing said projecting stem portion in unitary relation to said petal structure and forming a pep head for the flower, said adhesive comprising the sole means securing stem to said petal structure.

4. A wire stemmed artificial flower cluster comprising, in combination, a plurality of flowers each comprising a substantially flat petal structure, a wire stem extending substantially centrally through said petal structure and an adhesive engaged with said stem and the face side of said petal structure and adhesively securing said stem in unitary relation to said petal structure, said adhesive comprising the sole means securing said stem to said petal structure; the stems of said flowers being twisted together to form such cluster; and the stem of one flower being longer than those of the other flowers and extending beyond the twisted stems to form a stem for intertwisting with similar stems on other clusters to assemble a plurality of such clusters into a group.

5. A wire stemmed artificial flower cluster comprising, in combination, a plurality of flowers each comprising a substantially flat petal structure, a wire stem extending substantially centrally through said petal structure and an adhesive engaged with said stem and the face side of said petal structure and adhesively securing said stem in unitary relation to said petal structure; said adhesive comprising the sole means securing said stem to said petal structure; the stems of said flowers being twisted together to form such cluster; a wrapper substantially completely covering such twisted stems; and the stem of one flower being longer than those of the other flowers and extending beyond the covered twisted stems to form a stem for intertwisting with similar stems on other clusters to assemble a plurality of such clusters into a group.

6. A wire stemmed artificial flower cluster comprising, in combination, a plurality of flowers each comprising a substantially flat petal structure, a wire stem extending substantially centrally through said petal structure and an adhesive engaged with said stem and the face side of said petal structure and adhesively securing said stem in unitary relation to said petal structure; said adhesive comprising the sole means securing said stem to said petal structure; the stems of said flowers being twisted together to form such cluster; a spray and a wrapper substantially completely covering such twisted stems; and the stem of one flower being longer than those of the other flowers and extending beyond the covered twisted stems to form a stem for intertwisting with similar stems on other clusters to assemble a plurality of such clusters into a group.

7. A wire stemmed artificial flower cluster comprising, in combination, a plurality of flowers each comprising a substantially flat petal structure, a wire stem extending substantially centrally through said petal structure and an adhesive engaged with said stem and the face side of said petal structure and adhesively securing said stem in unitary relation to said petal structure; said adhesive comprising the sole means securing said stem to said petal structure; the stems of said flowers being twisted together to form such cluster; a paper spray and a paper wrapper substantially completely covering such twisted stems; and the stem of one flower being longer than those of the other flowers and extending beyond the covered twisted stems to form a stem for intertwisting with similar stems on other clusters to assemble a plurality of such clusters into a group.

8. The method of making an artificial flower which comprises piercing a cut fabric petal structure with a wire stem substantially centrally through said petal structure from the back to the face thereof so that a portion of said stem projects a short distance forward of the face of said petal structure; and, following such piercing, applying a globule of adhesive to such stem portion and the face of the petal structure to adhesively secure said stem to said petal structure and form a pep head for the flower.

9. The method of making an artificial flower, which comprises piercing a cut fabric petal structure with the end of a wire so that the wire extends a short distance through said petal structure from the back to the face thereof while firmly clamping the petal structure; following such piercing, applying a globule of adhesive to the end of said wire and the face of the petal structure to adhesively secure the projecting end of said wire to said petal structure face and form a pep head for the flower; and severing said wire at a distance from such end to form a stem for the flower.

10. The method of forming a cluster of artificial flowers, which comprises simultaneously shaping and cutting a plurality of petal structures from an elongated piece of fabric simultaneously piercing each petal structure with the end of an elongated wire so that each wire extends a short distance through one of said petal structures from the back to the face thereof while clamping said petal structures firmly against movement following such piercing, applying an adhesive to each projecting wire end and the face of the associated petal structure to adhesively secure the wires to the petal structures and form pep heads for the flowers; severing each wire at a distance from such ends to form stems for the flowers, the length of one wire being longer than that of the others; grouping said flowers and twisting their stems together to form a cluster having a single stem wire projecting beyond the twisted stems; and wrapping a spray and a stem covering around the twisted stems.

DANIEL GLASGOW.
HORACE GLASGOW.

REFERENCES CITED

The following references are of record in the file of this patent:

UNITED STATES PATENTS

| Number | Name | Date |
|---|---|---|
| 858,367 | Brodtauf et al. | July 2, 1907 |
| 899,852 | Warner | Sept. 29, 1908 |
| 1,518,909 | Foldessy | Dec. 9, 1924 |
| 1,611,713 | Bentkamp | Dec. 21, 1926 |
| 1,730,628 | Rogers | Oct. 8, 1929 |
| 2,046,669 | Wood | July 7, 1936 |
| 2,467,565 | Owens et al. | Apr. 19, 1949 |
| 2,467,572 | Weisselberg | Apr. 19, 1949 |

FOREIGN PATENTS

| Number | Country | Date |
|---|---|---|
| 20,961 | Great Britain | Dec. 31, 1889 |
| 541,034 | Great Britain | Nov. 10, 1941 |